April 19, 1932. S. KERSTEN 1,854,796
WATER FAUCET
Filed May 12, 1930
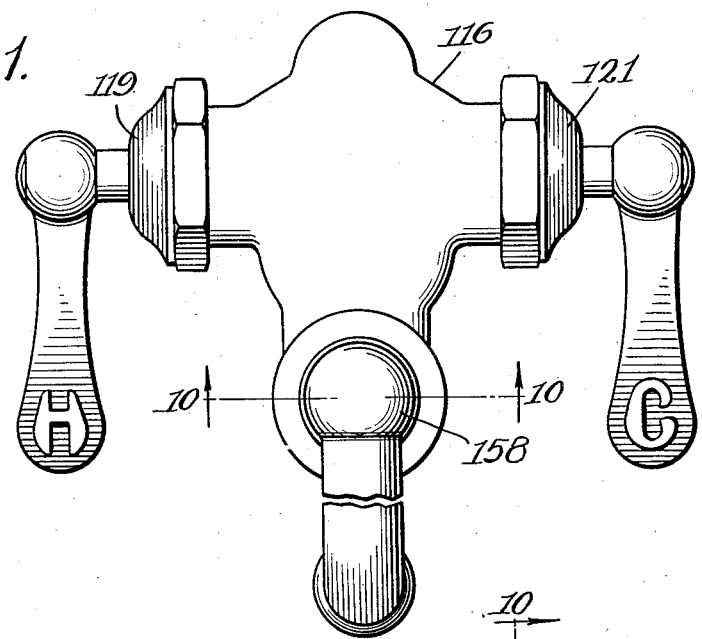
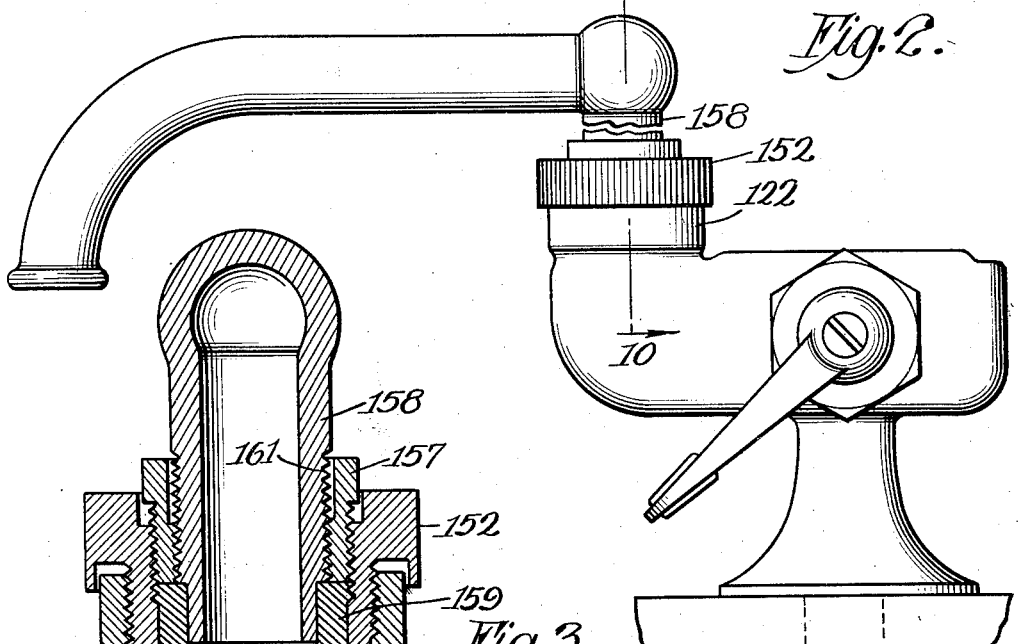
Inventor
Samuel Kersten
By George E. Mueller
Atty.

Patented Apr. 19, 1932

1,854,796

UNITED STATES PATENT OFFICE

SAMUEL KERSTEN, OF CHICAGO, ILLINOIS

WATER FAUCET

Application filed May 12, 1930. Serial No. 451,563.

My invention relates in general to water faucets, and more in particular to hot and cold water mixing faucets adapted for lavatory use. The invention also contemplates the use with such a faucet of improved water control features and water discharge features as will be pointed out.

While the features of my invention are adapted for use in many ways, I shall describe them in connection with the usual lavatory or wash bowl.

Until somewhat recently it has been customary to use separate hot and cold water faucets on most lavatory basins, at least for home use, the user of the basin filling the same from the two faucets with water having a proper temperature for washing. Rather recently a demand has been made for combination faucets, in which the basin would not be filled with water unless desired by the user, who could adjust a single stream of water to have a satisfactory temperature for washing, and then wash in the running stream.

One of the principal objects of my present invention is to provide an improved faucet.

Another object is the provision of a faucet in which fully satisfactory mixing of hot and cold water takes place.

Another object is the provision of an improved water saving feature adapted for use with this type of faucet.

Other objects and features of the invention will be apparent from a consideration of the following detailed description taken with the accompanying drawings, wherein, Fig. 1 is a plan view of a form of faucet employing a swinging spout, Fig. 2 is a side elevational view of the faucet shown in Fig. 1, and Fig. 3 is a sectional view taken along the line 10—10 of Fig. 2, and showing the details of the swinging spout construction.

Combination faucets for mixing hot and cold water are often provided with swinging spouts, and I show a preferred form having certain desirable novel features. While these features may be employed in other embodiments, the disclosure of Figs. 1 to 3 inclusive makes use of my preferred form of mixing faucet.

A faucet body 116 is provided with chambers and of valve mechanisms 119 and 121 for controlling the delivery of water to the outlet. The outlet 122 of the faucet proper projects vertically upward and the swinging spout of my invention is attached thereto. A swinging spout nozzle 151 is threaded into the faucet outlet and has a knurled outer portion 152 and an inner head 153 having a closed end and radially extending apertures 150 in the head. This head is surrounded by a water controlling sleeve 154 having apertures 149 in radial alignment with apertures 150. Sleeve 154 may be locked in position by a set-screw 148. The apertures 150 and 149 may evidently be made of any size desired and the size of the passage from the mixing chamber into the spout may be controlled by setting sleeve 154 in such a position that the apertures partially overlap. If it is desired to shut off the faucet completely, sleeve 154 may be positioned so that the apertures are out of registry, in which case it will be impossible for water to flow from the system even though the valves are open. A washer 156, preferably made of hard fibre, is clamped between shoulder 147 on the faucet outlet and an oppositely facing shoulder on the swinging spout nozzle. This swinging spout nozzle is interiorally threaded for the reception of a packing nut 157 and this packing nut is interiorally threaded for receiving a swinging spout 158. Suitable packing material 159 is held in place by the packing nut 158.

Now instead of the usual swinging spout construction in which the swinging spout is spun over an annular ridge on a stationary piece, I swing the spout on the threads which connect it to the packing nut 157. These threads run approximately twenty to the inch (standard threads), and since the spout swings only through 180 degrees at the most, the greatest longitudinal movement thereof is approximately 1/40 of an inch. I secure great advantages in economy of construction, etc., by this arrangement and find that this slight movement is imperceptible.

In assembling this faucet with the swinging spout the swinging spout nozzle is first applied in position with the sleeve 154 at the proper fitting and with the washer 156 in place. The packing nut 157 is then placed over the swinging spout piece 158, being threaded on to this swinging spout piece as far as possible. In Fig. 3 this would mean that the packing nut 157 would be in the top of the threads 161 shown on the swinging spout. The packing material 159 is then placed in position and the packing nut 157 then screwed down into the swinging spout nozzle so as to compress the packing in position. In doing this the nut is packed down off of the swinging spout approximately half the length of the threads, this being possible because the threads are of the same pitch, although it is not necessary that they be matched exactly. This places the parts in the position shown in the drawings, at which time the faucet and swinging spout are ready for use.

In the embodiment shown the spout projects upwardly. It is obvious that the same features can be employed and the spout connected at the bottom of the faucet. With this arrangement, only the water at lowered pressure comes in contact with threads of the spout, and with the packing 159, preventing its passage through the threads as a leak. The relatively tapered opening in the spout readily passes the water so there is little, if any, pressure of any kind on the packing 159.

In the spout arrangement described, it is quite obvious that a sturdy swinging spout results, because instead of swinging on a single ring or ridge, the spout is supported along a substantial portion of its length by reason of the threads thereon. The construction is also advantageous in that it is impossible to build up pressure on the swinging joint itself and so the possibility of a leak at this point is practically negligible.

While I have described the details of my invention to make the same clear to those skilled in the art, it is obvious that other details and embodiments may be used without departing from the invention as defined in the appended claims.

What I claim is new and desire to protect by Letters Patent of the United States is:—

1. In a combination faucet, a single discharge orifice, a swinging spout nozzle attached to said discharge orifice, a water saving head carried by said nozzle, a swinging spout, means for threading said swinging spout to said nozzle whereby said spout swings when in use by turning movement on its threads as on a joint, and means for preventing full pressure of water on said swinging spout joint.

2. In a combination faucet, a single discharge orifice, a swinging spout nozzle, a packing nut screwed into said nozzle, a swinging spout screwed into said packing nut, and packing material held between said packing nut and nozzle and lying along a portion of said spout, whereby said spout may be swung on its threads without the possibility of a water leak therearound.

3. In a combination faucet, a single discharge orifice, a swinging spout nozzle attached by screw threads to said faucet and projecting into the orifice, a water saving head carried by said nozzle and extending into said orifice, a washer between said nozzle and faucet to prevent delivery of high pressure water against said threads, a swinging spout, and screw thread means for attaching said spout to said nozzle, the spout swinging when in use by turning on such threads.

4. In a combination faucet, a single discharge orifice, a swinging spout nozzle attached by screw threads to said faucet and projecting into the orifice, a water saving head carried by said nozzle and extending into said orifice, a washer between said nozzle and faucet to prevent delivery of high pressure water against said threads, a swinging spout, and screw thread means for attaching said spout to said nozzle, the spout swinging when in use by turning on such threads, and packing material for preventing water from coming in contact with said nozzle threads after passing through said water saving head.

5. In a combination faucet, a single discharge orifice having interior threads, a swinging spout nozzle threaded into said orifice, an integral water saving head carried by said nozzle, an annular shoulder adjacent said orifice, a washer clamped between said shoulder and said nozzle, internal threads on such nozzle, a packing nut having internal and external threads secured within said nozzle, a swinging spout threaded within said packing nut and having an unthreaded portion, and packing material between said packing nut and nozzle and lying along said unthreaded portion of the nozzle, said nozzle being swung by turning it on its threads within said packing nut.

In witness whereof, I hereunto subscribe my name this 24th day of April, 1930.

SAMUEL KERSTEN.